L. H. CRIBBS.
HOE.
APPLICATION FILED MAR. 29, 1916.
1,206,678.
Patented Nov. 28, 1916.
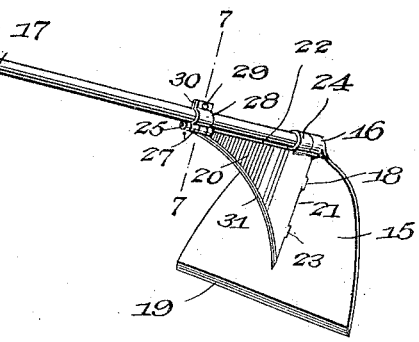
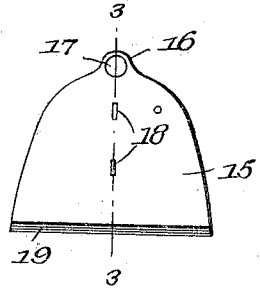
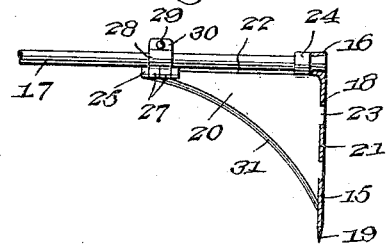
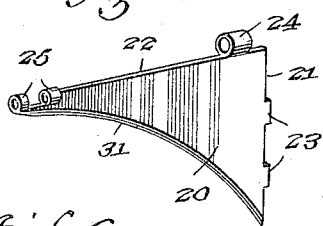
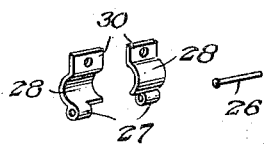
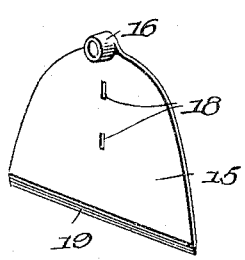
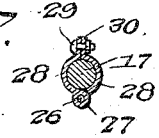
Witnesses
Hugh H. Ott
Inventor
Luther H. Cribbs
By Victor J. Evans
Attorney

UNITED STATES PATENT OFFICE.

LUTHER H. CRIBBS, OF BLANTON, FLORIDA, ASSIGNOR OF ONE-HALF TO EUGENE S. BLOCKER, OF BLANTON, FLORIDA.

HOE.

1,206,678. Specification of Letters Patent. Patented Nov. 28, 1916.

Application filed March 29, 1916. Serial No. 87,546.

*To all whom it may concern:*

Be it known that I, LUTHER H. CRIBBS, a citizen of the United States, residing at Blanton, in the county of Pasco and State of Florida, have invented new and useful Improvements in Hoes, of which the following is a specification.

This invention relates to hoes, and it has for its object to produce a hoe of simple and improved construction having two blades at substantially right angles to one another, such an implement being found extremely convenient for cutting sweet potato vines and for a variety of other purposes.

A further object of the invention is to simplify and improve the construction and manner of assembling the hoe blades with each other and with the hoe handle in such a manner that a durable, useful and efficient tool will be produced.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a perspective view of a hoe constructed in accordance with the invention. Fig. 2 is an end view showing the main blade of the hoe in elevation. Fig. 3 is a sectional view taken on the line 3—3 in Fig. 2. Fig. 4 is a perspective view of the auxiliary blade. Fig. 5 is a perspective view of the main blade detached. Fig. 6 is a perspectitve view showing the members of the clamp whereby the auxiliary blade is assembled with the hoe handle. Fig. 7 is a sectional detail view taken on the line 7—7 in Fig. 1.

Corresponding parts in the several figures are denoted by like characters of reference.

The main hoe blade 15 has the customary eye 16 whereby it is mounted on a handle 17. Said hoe blade has been shown as being provided with elongated slots 18 extending between the eye 16 and the cutting edge 19 about midway between the side edges of the blade.

The auxiliary blade 20 is of approximately triangular shape having two straight edges 21, 22 at approximately right angles to each other or at an angle to each other substantially equal to the angle between the main blade 15 and the handle 17. The edge 21 of the blade 20 is provided with lugs 23 adapted to engage the slots 18 of the main blade. The edge 22 of the blade 20 has at the end thereof adjacent to the edge 21 an eye 24 adapted to engage the hoe handle. At the opposite end of the edge 22 are eyes 25 adapted to receive a pin or pintle 26, whereby said eyes are connected with the mating eyes 27 formed on clamping members 28 which may encircle the handle 17 on which said members are firmly secured by a clamping bolt 29 extending through apertured flanges 30 with which the clamp members 28 are provided. The third edge of the blade 20 which extends between the edges 21 and 22, and which is indicated by 31, is slightly arcuate and is ground so as to produce a sharp cutting edge.

It will be readily seen from the foregoing description that the auxiliary blade 20 may be readily assembled with an ordinary hoe by simply forming the slots 18 in the blade 15 of such hoe, after which the blade 20 is adjusted by sliding the eye 24 over the handle until the lugs 23 engage the slots 18, after which the clamp members 28 are adjusted to encircle the handle and secured by the bolt 29 which may be tightened to produce a clamping action, whereby the auxiliary blade will be retained securely in position. The manner of assembling may be rendered more secure by the swaging or upsetting the end portions of the lugs 23 that project through the slots 18 of the blade 15.

The hoe of the present invention, it will be seen, is provided with two cutting edges at right angles to each other, the longitudinal cutting edge being in an oblique or slanting position, so that it will prove very useful for cutting sweet potato vines and for other classes of work. The said auxiliary blade also constitutes a brace whereby the main blade 15 is materially reinforced.

Having thus described the invention, what is claimed as new, is:—

1. A hoe comprising a handle, a main blade having an eye engaging the same, an auxiliary blade having an eye at one end adjacent to the eye of the main blade and having auxiliary eyes at the other end thereof, clamp members engaging the handle and having eyes positioned between the eyes of the auxiliary blade, and a pintle assembling the eyes of the auxiliary blade with the eyes of the clamp members.

2. A hoe comprising a handle, a main blade having an eye engaging the same, an auxiliary blade having an eye at one end adjacent to the eye of the main blade and having auxiliary eyes at the other end thereof, clamp members engaging the handle and having eyes positioned between the eyes of the auxiliary blade, and a pintle assembling the eyes of the auxiliary blade with the eyes of the clamp members, said auxiliary blade being provided with lugs engaging slots in the main blade to prevent rotation of said auxiliary blade about the axis of the handle.

In testimony whereof I affix my signature in presence of two witnesses.

LUTHER H. CRIBBS.

Witnesses:
JAS. E. TURNER,
EUGENE S. BLOCKER.

Copies of this patent may be obtained for five cents each, by addressing the "Commissioner of Patents, Washington, D. C."